2,841,314

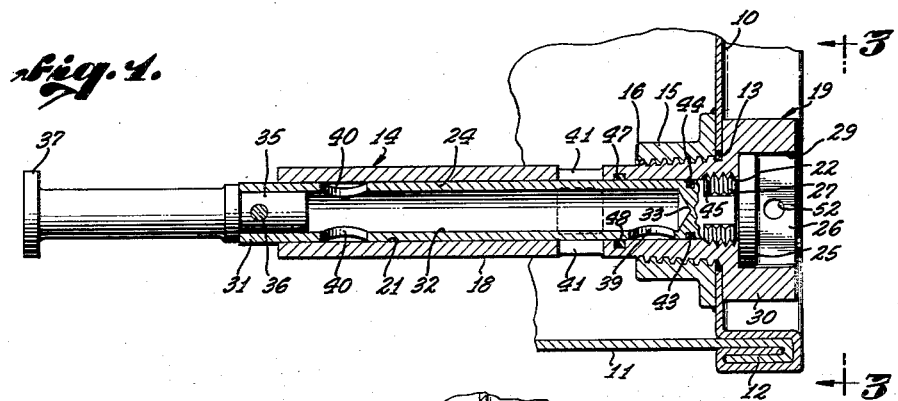
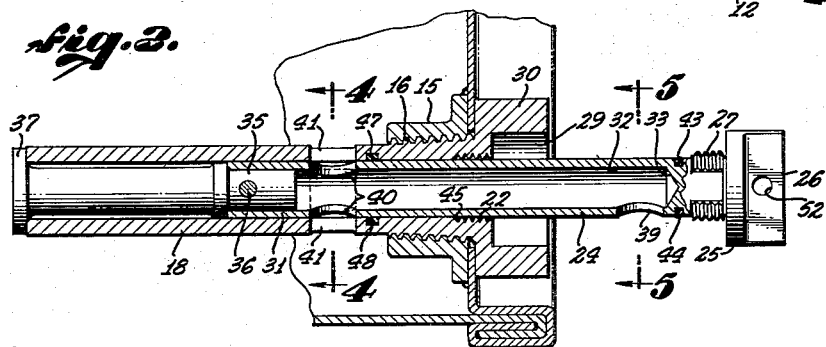
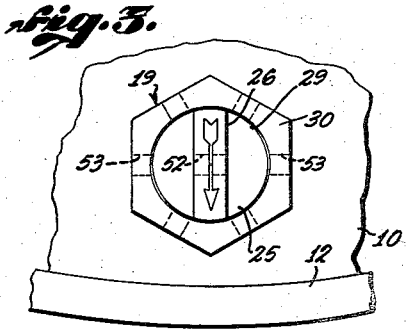
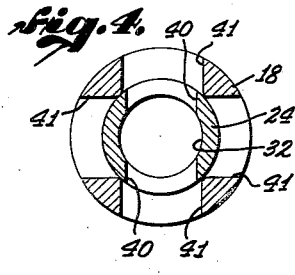
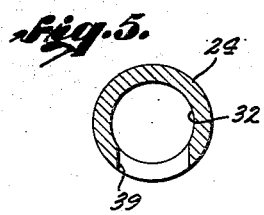
GILBERT M. MUNSON &
PHILLIP R. GETTIER,
INVENTOR.
HUEBNER, BEEHLER,
WORREL & HERZIG,
ATTORNEYS.

FAUCET

Gilbert M. Munson, Sacramento, and Philip R. Geitier, Los Angeles, Calif.

Application March 1, 1954, Serial No. 413,074

1 Claim. (Cl. 222—519)

This invention relates to improvement in faucets, and more particularly to faucets for withdrawing liquids from containers, such as casks or drums.

It is an object of this invention to provide an improved faucet of the above mentioned character which operates in an expanded position for withdrawing liquids from a container and which has sealing means for maintaining the faucet tight against leaks.

Another object of the invention is to provide an improved faucet of the above mentioned character which is adapted to receive a lock means for sealing the faucet in a closed position.

Other objects and advantages of the invention will be apparent during the course of the following part of this specification, wherein the details of construction and mode of operation of a preferred embodiment of the invention are described with reference to the accompanying drawing, in which:

Figure 1 is a central vertical longitudinal section through a faucet embodying the invention, and mounted in a wall of a drum;

Figure 2 is a section similar to that of Figure 1 but showing the faucet in its expanded position for discharging liquid from the drum;

Figure 3 is an end elevation of the faucet looking in the direction of the arrows on line 3—3 of Figure 1;

Figure 4 is a transverse section through the faucet on an enlarged scale and taken on line 4—4 of Figure 2; and Figure 5 is a detail cross section taken on line 5—5 of Figure 2.

Referring now to the drawings more in detail and by reference numerals, an end wall of a container, and more particularly a drum, is designated by numeral 10 and such end wall is joined to a side wall 11 of the drum by a usual chime construction as shown at 12. There is an opening 13 in the end wall of the drum for receiving a faucet designated generally by the numeral 14. Welded or otherwise suitably secured on the inside face of the end wall and in axial alignment with the opening 13, is a collar 15 having an internally threaded opening 16 for mounting the faucet in the drum wall.

The faucet comprises a cylindrical outer body member 18 which is externally threaded to mate with the screw threads in the collar opening 16. For turning the faucet in the collar opening, the body of the faucet has a non-circular head 19 on the forward end thereof. The head 19 is of larger diameter than the body 18 thus providing an inside face of the head for engagement with the outside face of the drum wall around the drum opening 13 whereby the head 19 cooperates with the collar 15 in holding the faucet on the drum. There is an axial bore 21 extending through the body member 18 making an open-ended tube of the body member. A tapped counterbore 22 of shorter axial length and of larger diameter than the main bore 21 extends coaxially with the main bore from the head end of the body.

Rotatable and slidable axially in the main bore 21 is a stem 24 having a circular end plate 25 on its forward end and a rib or handle member 26 extending diametrically of the outer face of the end plate. The neck of the stem, which is designated by numeral 27, is of larger diameter than the cylindrical body of the stem and is externally threaded for engaging the threads of the counterbore 22. For accommodating the head of the stem, i.e., end plate 25 and handle 26, the head 19 of the main body part 18 of the faucet has a cavity 29 of circular cross-section and of sufficient depth that when the neck of the stem is screwed into the counterbore 22 the handle member 26 does not extend outwardly beyond the rim of the cavity. Thus the head 19 is cup-shaped, that is, it has an annular wall 30 which defines the cavity, and the axial dimension of the head is less than the length of the chime 12 so that when drums having faucets as herein shown are stacked end on end, the faucet heads are protected by the chimes of the drums from being broken or otherwise damaged.

From that end of the stem which is located in the interior of the drum, and for descriptive convenience is designated by the numeral 31, there is a cylindrical bore 32 extending axially into the stem to a point 33 adjacent the neck portion of the stem. The interior or tail end 31 of the stem bore is closed by a plug 35 which is suitably fixed in the end of the bore 32 as by a pin 36. The plug 35 not only closes the tail end of the stem but also extends axially beyond the stem and has a circular disc 37 on its outer end which is engageable with the tail end of the body 18 for providing a stop means which limits outward movement of the stem from the body when the stem is moved to its liquid discharging position as shown in Figure 2 of the drawing. The extent to which the stem may be withdrawn from the head end of the body is predetermined by the dimension of that portion of the plug which extends beyond the tail end of the stem.

The cylindrical bore 32 in the stem forms a section of a passageway for liquid to flow through the stem to a radially extending discharge opening 39 communicating with the forward end of the bore 32. The discharge opening 39 is located in the faucet at a point where it will extend beyond the rim of the chime 12 of the drum when the flanged end 37 of the plug is stopped against the tail end of the body member 18.

In the wall of the stem and adjacent the tail end thereof are radially extending inlet openings 40 located at a place in the stem where each such opening will be in registry with one of a series of circumferentially arranged apertures 41 in the wall of the tubular body portion 18 when the stem is moved outwardly to its liquid discharge position as predetermined by the length of the plug 35. Thus when the faucet is expanded so that the flange 37 abuts against the tail end of the body member 18 to thereby prevent further outward movement of the stem from the body, a passageway for discharging liquids from the interior of the drum is opened, such passageway comprising an aperture 41, an inlet opening 40, bore 32, and discharge opening 39.

An important feature of the faucet of this invention is the provision of sealing means preventing leakage from the faucet around its stem. To this end there is an annular groove 43 formed in the outer surface of the stem and lying in a plane transversely of the stem and adjacent the neck portion of the stem. The groove 43 receives an O-ring 44 or gasket of synthetic rubber or other suitable sealing ring material which can withstand corrosive attack from oil or gasoline or acid and the like. When the stem is in its faucet closed position as shown in Figure 1 of the drawing, the outer periphery of the O-ring 44 becomes pressed against the walls of the main bore 21 and the walls defining the groove 43 to constitute a leakproof seal preventing leakage of liquid through the main bore and through the head end of the faucet. The O-ring 44 is carried by the stem outwardly of the bore when the stem is extended to its liquid discharge position, and thus the O-ring must be slightly contracted and forced into the main bore 21 each time the faucet is closed. To prevent cutting of the outer periphery of the O-ring by the rim of the main bore, the inner end of the counterbore 22 is chamfered, as shown at 45, to form an annular beveled shoulder around the rim of the main bore, thus providing for more gradual contraction of the O-ring when it is forced into the main bore, and such beveled construction of the shoulder 45 eliminates the likelihood of cutting the O-ring.

Arranged inwardly of the O-ring 44 is another O-ring 47 which instead of being carried by the stem, as is the O-ring 44, is mounted in an annular groove 48 which extends in a plane transversely of the interior wall defining the main bore 18. The O-ring 47 is slightly expanded in encircling the stem which is axially slidable in the O-ring. Like the O-ring 44, the ring 47 constitutes a sealing gasket formed of synthetic rubber or other suitable gasket material.

As explained above, the faucet head 19 is cup-shaped so as to receive the faucet handle 26. During shipment of the drums it is desirable to seal the faucet in its closed position and for this purpose the handle 26 has a centrally arranged aperture 52 passing through the handle. Likewise, there is a series of circumferentially arranged radially extending apertures 53 in the annular wall 30 of the head, and these permit a sealing wire (not shown) or other lock means to be passed through the aperture 52 and through opposite and aligned apertures 53 in the head of the faucet, requiring that the sealing wire be severed or withdrawn prior to opening the faucet.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claim.

What is claimed is:

A faucet for withdrawing liquid from a container comprising: a cylindrical body having a head end and a tail end, the body having a main bore extending axially therethrough and defining an inside wall of the body, an internally threaded counterbore of larger diameter than the main bore coaxial with the main bore and adjacent the head end of the body, said counterbore having an inner end adjacent the main bore, said inner end being chamfered and providing a shoulder at said inner end facing toward the axis of the main bore, means externally of the body and adjacent the head end thereof for securing the faucet in a wall of the container with the tail end of the body arranged internally of the container, the body having an aperture formed therein spaced rearwardly of said faucet securing means, a cylindrical stem having a forward end and a rearward end and closely fitting in the main bore and being rotatable and axially slidable in the main bore from a faucet closed position to a liquid discharge position in which the forward end of the stem extends outwardly from the head end of the body, the forward end of the stem being externally threaded to engage the threads of the counterbore, an axially directed passageway in the stem having a closed forward end and a closed rearward end, a radially directed discharge opening in the stem communicating with the forward end of the passageway and being exposed when the stem is in its extended position, a radially directed inlet opening in the stem communicating with the rearward end of the passageway and registrable with said aperture when the stem is in its extended position, stop means limiting outward movement of the stem from the body beyond the place where said aperture and stem inlet opening are in registry, an annular groove around the stem in a transverse plane between the inner end of threads on the stem and the discharge opening, an annular sealing ring in the groove and engageable with said inside wall for sealing the faucet when in faucet closed position against leakage of liquid around the stem, said inside wall having an annular recess formed therein and disposed in a transverse plane substantially normal to the axis of the main bore, said transverse plane being disposed intermediate said aperture and the position of said discharge opening when the stem is in its faucet-closed position, and a sealing ring in said recess providing a seal between the stem and the body at all positions of the stem.

References Cited in the file of this patent

UNITED STATES PATENTS

| | | |
|---|---|---|
| 25,853 | Stickney | Oct. 18, 1859 |
| 247,668 | Loftus | Sept. 27, 1881 |
| 1,080,273 | Fountain | Dec. 2, 1913 |
| 1,458,718 | Lord | June 12, 1923 |
| 1,859,126 | Boeuf | May 17, 1932 |
| 1,924,057 | Draper et al. | Aug. 22, 1933 |
| 2,038,833 | Frank et al. | Apr. 28, 1936 |

FOREIGN PATENTS

| | | |
|---|---|---|
| 689,990 | France | Sept. 15, 1930 |